United States Patent
Scholz et al.

(10) Patent No.: US 9,159,339 B2
(45) Date of Patent: Oct. 13, 2015

(54) WIRE AND WIRE LEAD DESIGNS FOR A WIRE-ASSISTED MAGNETIC WRITE DEVICE

(75) Inventors: Werner Scholz, Pittsburgh, PA (US); Thomas William Clinton, Pittsburgh, PA (US); Sharat Batra, Wexford, PA (US); Mark Thomas Kief, Lakeville, MN (US); Eric S. Linville, Shakopee, MN (US); Wei Peng, Wilkinsburg, PA (US); Kenneth A. Medlin, Pittsburgh, PA (US)

(73) Assignee: Seagate Technology LLC, Cupertino, CA (US)

( * ) Notice: Subject to any disclaimer, the term of this patent is extended or adjusted under 35 U.S.C. 154(b) by 1513 days.

(21) Appl. No.: 11/925,012

(22) Filed: Oct. 26, 2007

(65) Prior Publication Data

US 2009/0109570 A1    Apr. 30, 2009

(51) Int. Cl.
  *G11B 5/31*    (2006.01)
  *G11B 5/11*    (2006.01)
  *G11B 5/127*   (2006.01)
  *G11B 5/00*    (2006.01)

(52) U.S. Cl.
  CPC ........ *G11B 5/1278* (2013.01); *G11B 2005/001* (2013.01); *G11B 2005/0029* (2013.01)

(58) Field of Classification Search
  CPC ............... G11B 5/1278; G11B 5/315; G11B 2005/001; G11B 2005/0021; G11B 2005/0029
  USPC .................................. 360/125.3, 125.32, 128
  See application file for complete search history.

(56) References Cited

U.S. PATENT DOCUMENTS

| | | | |
|---|---|---|---|
| 6,665,136 B2 | 12/2003 | Clinton et al. | |
| 7,149,055 B2 | 12/2006 | Clinton et al. | |
| 7,212,367 B2 | 5/2007 | Clinton et al. | |
| 2003/0043490 A1* | 3/2003 | Clinton et al. | 360/55 |
| 2003/0142440 A1* | 7/2003 | Clinton et al. | 360/123 |
| 2004/0169950 A1 | 9/2004 | Clinton et al. | |
| 2005/0111137 A1* | 5/2005 | Ju et al. | 360/126 |
| 2005/0280935 A1 | 12/2005 | Clinton et al. | |
| 2006/0198047 A1* | 9/2006 | Xue et al. | 360/126 |
| 2007/0036040 A1 | 2/2007 | Mihalcea et al. | |
| 2008/0112078 A1* | 5/2008 | Hsiao et al. | 360/123.01 |
| 2008/0112087 A1* | 5/2008 | Clinton et al. | 360/317 |
| 2008/0117545 A1* | 5/2008 | Batra et al. | 360/125.01 |
| 2008/0316631 A1* | 12/2008 | Gao et al. | 360/55 |
| 2008/0316643 A1* | 12/2008 | Linville et al. | 360/110 |

* cited by examiner

*Primary Examiner* — Craig A. Renner
(74) *Attorney, Agent, or Firm* — Mueting, Raasch & Gebhardt, P.A.

(57) ABSTRACT

A magnetic device includes a write element having a write element tip that defines a medium confronting surface. The write element is operable to generate a first field at the medium confronting surface. A conductor is proximate the write element tip and first and second conductive leads are connected to the conductor and configured to deliver a current to the conductor to generate a second field that augments the first field. First and second side elements are disposed on opposite sides of the write element tip in a cross-track direction at the medium confronting surface. At least a portion of the first conductive lead is disposed adjacent the first side element on a side opposite the medium confronting surface, and at least a portion of the second conductive lead is disposed adjacent the second side element on a side opposite the medium confronting surface.

18 Claims, 8 Drawing Sheets

WIRE AND WIRE LEAD DESIGNS FOR A WIRE-ASSISTED MAGNETIC WRITE DEVICE

FIELD OF THE INVENTION

The present invention relates to magnetic devices. More particularly, the present invention relates to a magnetic writer including a conductor that carries a current to generate a magnetic field that assists a write field.

BACKGROUND

As magnetic recording storage densities continue to progress in an effort to increase the storage capacity of magnetic storage devices, magnetic transition (i.e., bit) dimensions and critical features of the recording device are being pushed below 100 nm. In some cases, the critical dimensions of the write element are decreasing faster than the spacing between the write element and the magnetic medium. This presents a significant challenge in that not only is the magnetic field strength effectively reduced, but the magnetic field profile at the medium is more poorly confined. The result is that off-track fields can cause undesirable effects such as adjacent track or side track erasure. Thus, an important design consideration is to confine the magnetic fields more effectively without significantly degrading the field strength at the medium.

In addition, making the recording medium stable at higher areal densities requires magnetically harder (i.e., high coercivity) storage medium materials. A magnetically harder medium may be written to by increasing the saturation magnetization value of the magnetic material of the recording device to increase the magnetic field applied to the magnetic medium. However, the rate of increase of the saturation magnetization value is not sufficient to sustain the annual growth rate of bit areal densities. Another approach is to provide a stronger write field by incorporating a conductor adjacent to the tip of the write pole that produces a magnetic field to reduce the coercivity of the magnetic medium near the write pole. This allows data to be written to the high coercivity medium with a lower magnetic field from the write pole. However, due to the finite thickness of the conductor in the down track direction and its location, the magnetic field generated by the conductor can have an adverse effect on the down-track field gradient. In addition, leads that deliver current to the conductor may present potential processing and reliability problems due to exposure of the lead material to corrosion inducing agents. Furthermore, when side shields are incorporated in the writer, a portion of the leads near the medium confronting surface, write pole, and assist device are often replaced with magnetic materials, which generally do not have ideal electrical and thermal properties.

SUMMARY

The present invention relates to a magnetic device including a write element having a write element tip that defines a medium confronting surface. The write element is operable to generate a first field at the medium confronting surface. A conductor is proximate the write element tip and first and second conductive leads are connected to the conductor and configured to deliver a current to the conductor to generate a second field that augments the first field. First and second side elements are disposed on opposite sides of the write element tip in a cross-track direction at the medium confronting surface. At least a portion of the first conductive lead is disposed adjacent the first side element on a side opposite the medium confronting surface of the first side element, and at least a portion of the second conductive lead is disposed adjacent the second side element on a side opposite the medium confronting surface of the second side element.

In another aspect, a magnetic device includes a write element including a write element tip. The write element is operable to generate a first field at the write element tip. A conductor is proximate the write element tip at a medium confronting surface and has a maximum sustainable current density $j_{max}$, a stripe height h extending from the medium confronting surface to a side of the conductor distal from the medium confronting surface, and a thickness t extending in a down-track direction. A current source, having a maximum current $I_{max}$, provides a current to the conductor to generate a second field that augments the first field. The stripe height h is about equal to $$\frac{I_{max}}{j_{max} \times t}.$$

In a further aspect, a magnetic writer includes a write element having a write element tip that defines a medium confronting surface. The write element is operable to generate a first field at the medium confronting surface. A return element is magnetically coupled to the write element distal from the medium confronting surface. A conductor is proximate the write element tip at the medium confronting surface. First and second conductive heat sinks are connected to the conductor and configured to deliver a current to the conductor to generate a second field that augments the first field. First and second side shields are disposed on opposite sides of the write element tip in a cross-track direction at the medium confronting surface. At least a portion of the first side shield is disposed adjacent to the first conductive heat sink on a side of the first side shield opposite the medium confronting surface, and at least a portion of the second side shield is disposed adjacent to the second conductive heat sink on a side of the second side shield opposite the medium confronting surface.

The above summary of the present invention is not intended to describe each disclosed embodiment or every implementation of the present invention. The figures and the detailed description which follow more particularly exemplify illustrative embodiments.

While some of the above-identified figures set forth one or more embodiments of the invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. It should also be understood that the above-identified figures are not drawn to scale.

DETAILED DESCRIPTION

Figure 1:
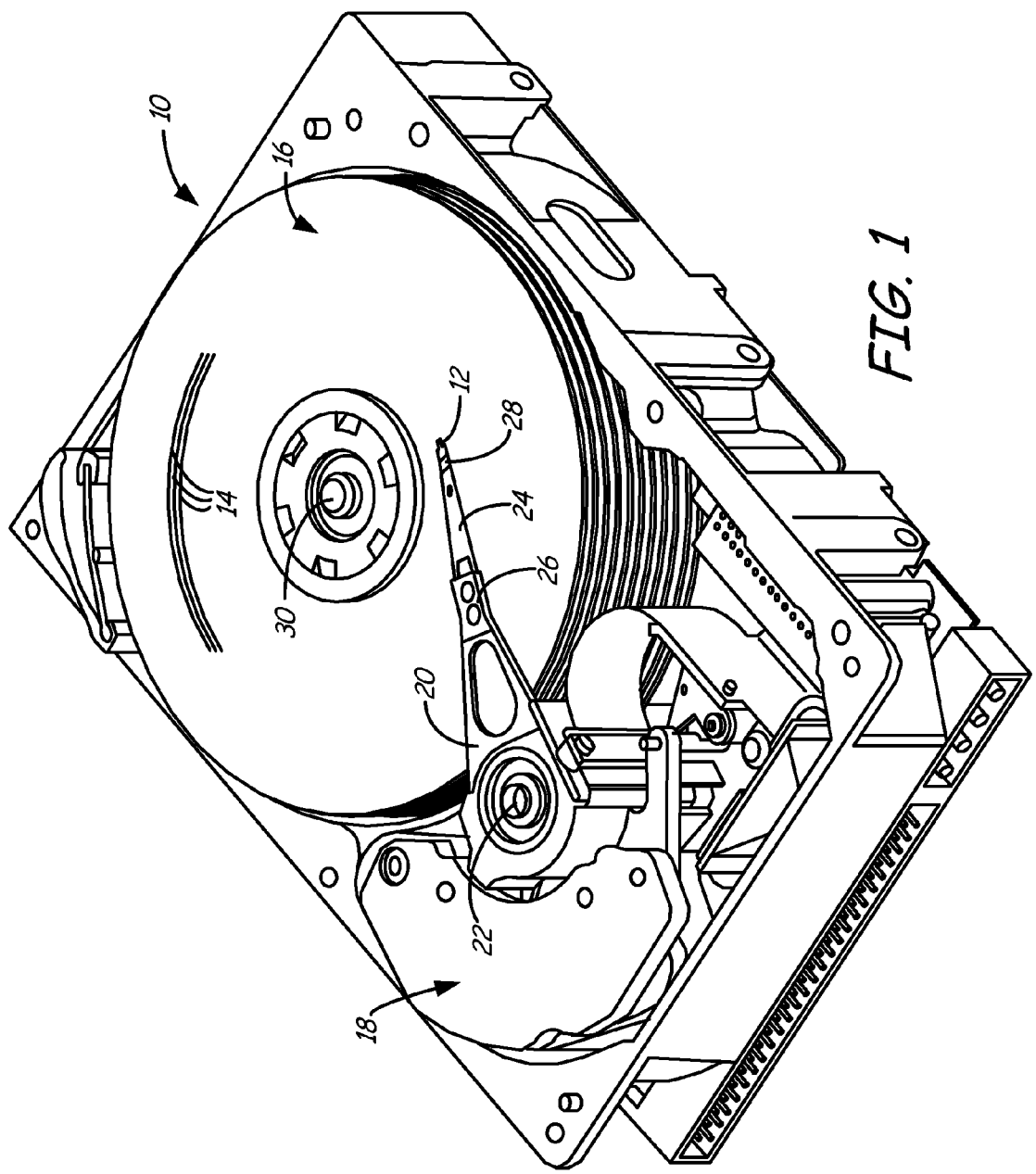
FIG. 1 is a perspective view of a magnetic recording system.

FIG. 1 is a perspective view of a disc drive 10 including an actuation system for positioning slider 12 over track 14 of magnetic medium 16. The particular configuration of disc drive 10 is shown for ease of describing the present invention and is not intended to limit the scope of the present invention in any way. Disc drive 10 includes a voice coil motor (VCM) 18 arranged to rotate an actuator arm 20 on a spindle around an axis 22. A load beam 24 is connected to actuator arm 20 at a head mounting block 26. A suspension 28 is connected to an end of load beam 24 and slider 12 is attached to suspension 28. VCM 18 is regulated by a controller that is not shown in this view and is well known in the art. Magnetic medium 16 rotates around an axis 30, so that windage is encountered by slider 12 to keep it aloft a small distance above the surface of magnetic medium 16. Each track 14 of magnetic medium 16 is formatted with an array of data storage cells for storing data. Slider 12 carries a magnetic transducer (not shown in FIG. 1) for reading and/or writing data on tracks 14 of magnetic medium 16. The magnetic transducer is described in more detail by way of examples in the following figures.

Figure 2:
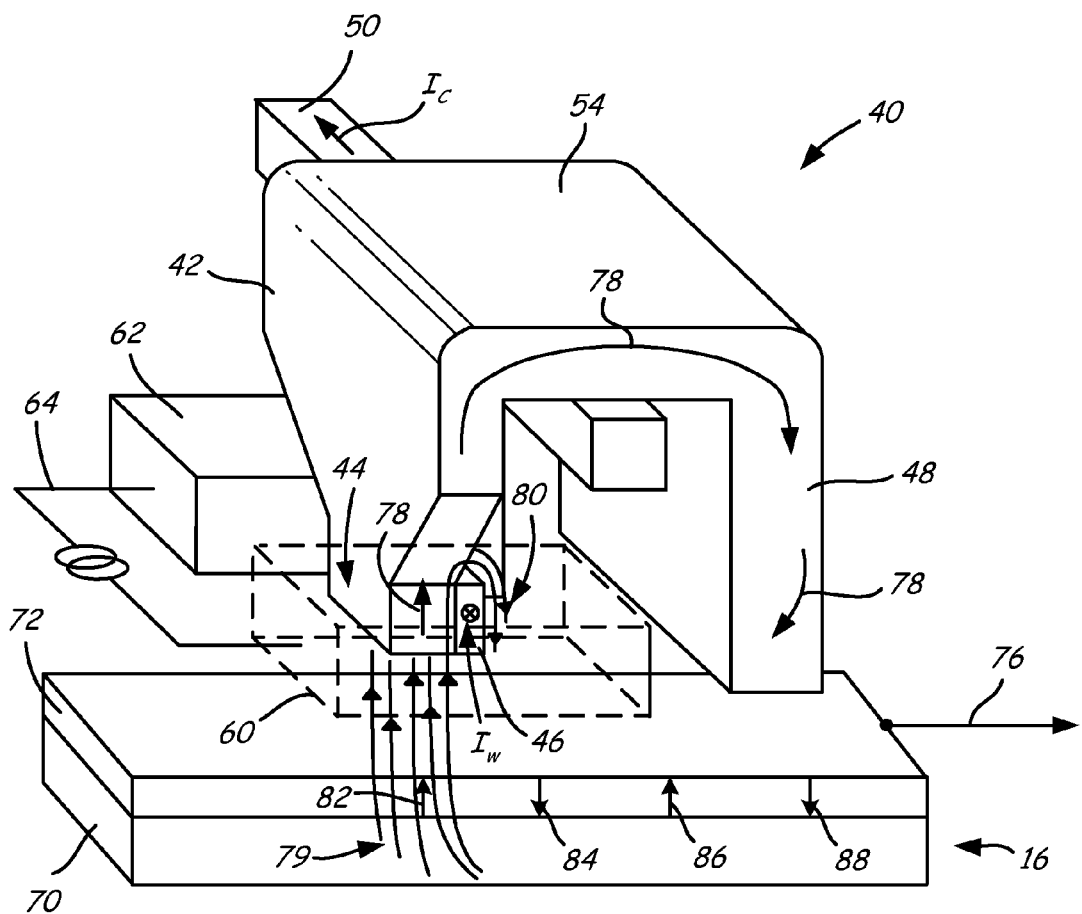
FIG. 2 is a perspective view of a magnetic writer including a conductor that carries a current to generate an assisting magnetic field.

FIG. 2 is a perspective view of magnetic writer 40, which includes write element 42 with write element tip 44, current carrying conductor 46, return element 48, and conductive coil 50. Magnetic writer 40 is a conceptual representation of an assisted magnetic writer and is provided to generally illustrate the functionality of an assisted magnetic writer. The general operation described below applies to the various magnetic writer embodiments described herein. However, the configuration shown is merely illustrative and does not limit or define any of the embodiments subsequently described.

Conductor 46 is positioned adjacent a trailing edge of write element tip 44. Write element 42 is magnetically coupled to return element 48 by magnetic stud 54. Conductive coil 50 (only a portion of which is shown) surrounds write element 42 such that portions of conductive coil 50 are disposed between write element 42 and return element 46. First lead/heat sink 60 and second lead/heat sink 62 (which is shown in phantom) are connected to conductor 46 at opposite cross-track ends of conductor 46. First lead/heat sink 60 and second lead/heat sink 62 are connected to current source 64 to provide current $I_w$ to conductor 46.

Magnetic writer 40 confronts magnetic medium 16 at a medium confronting surface defined by write element tip 44, conductor 46, and return element 48. Magnetic medium 16 includes soft underlayer (SUL) 70, and medium layer 72. Magnetic medium 16 is positioned proximate to magnetic writer 40 such that the surface of medium layer 72 opposite SUL 70 faces write element 42. Magnetic medium 16 is shown merely for purposes of illustration, and may be any type of medium usable in conjunction with magnetic writer 40, such as composite media, continuous/granular coupled (CGC) media, discrete track media, and bit-patterned media.

Magnetic writer 40 is carried over the surface of magnetic medium 16, which is moved relative to magnetic writer 40 as indicated by arrow 76 such that write element 42 leads return element 48, and is used to physically write data to magnetic medium 16. In order to write data to magnetic medium 16, current $I_C$ is caused to flow through conductive coil 50. The magnetomotive force in conductive coil 50 causes magnetic flux (illustrated by arrows 78) to travel from write element tip 44 perpendicularly through medium layer 72, across SUL 70, and through return element 48 and magnetic stud 54 to provide a first closed magnetic flux path. The direction of the write field (illustrated by arrows 79) at the medium confronting surface of write element tip 44, which is related to the state of the data written to magnetic medium 16, is controllable based on the direction that the first current flows through first conductive coil 50.

Magnetic writer 40 is shown merely for purposes of illustrating an example construction that may be used in conjunction with the principles of the present invention, and variations on this design may be made. For example, while a single trailing return element 48 is shown, a dual return element writer configuration may alternatively be employed including a return element on both the leading and trailing sides of write element 42. Furthermore, a shield may be formed to extend from return element 48 toward write element 42 proximate the medium confronting surface in a "trailing shield" magnetic writer design.

To write data to high coercivity medium layer 72, a stronger write field may be provided to impress magnetization reversal in the medium. To accomplish this, conductor 46 is provided proximate to magnetic medium 16 and the trailing side of write element tip 44. When current $I_w$ is applied to conductor 46, an assist magnetic field (illustrated by arrows 80) is generated that augments the write field produced by write element 42. The combination of write field 79 and assist field 80 generated by conductor 46 overcomes the high coercivity of medium layer 78 to permit controlled writing of data to magnetic medium 16. As magnetic medium 16 moves as illustrated by arrow 76, the direction of magnetization of magnetic domains 82, 84, 86, and 88 in medium layer 72 is affected by write field 79 and assist field 80 in the vicinity of write element tip 44. In addition, conductor 46 improves the write field gradient, which results in a stronger write field proximate to write element tip 44.

Figure 3A:
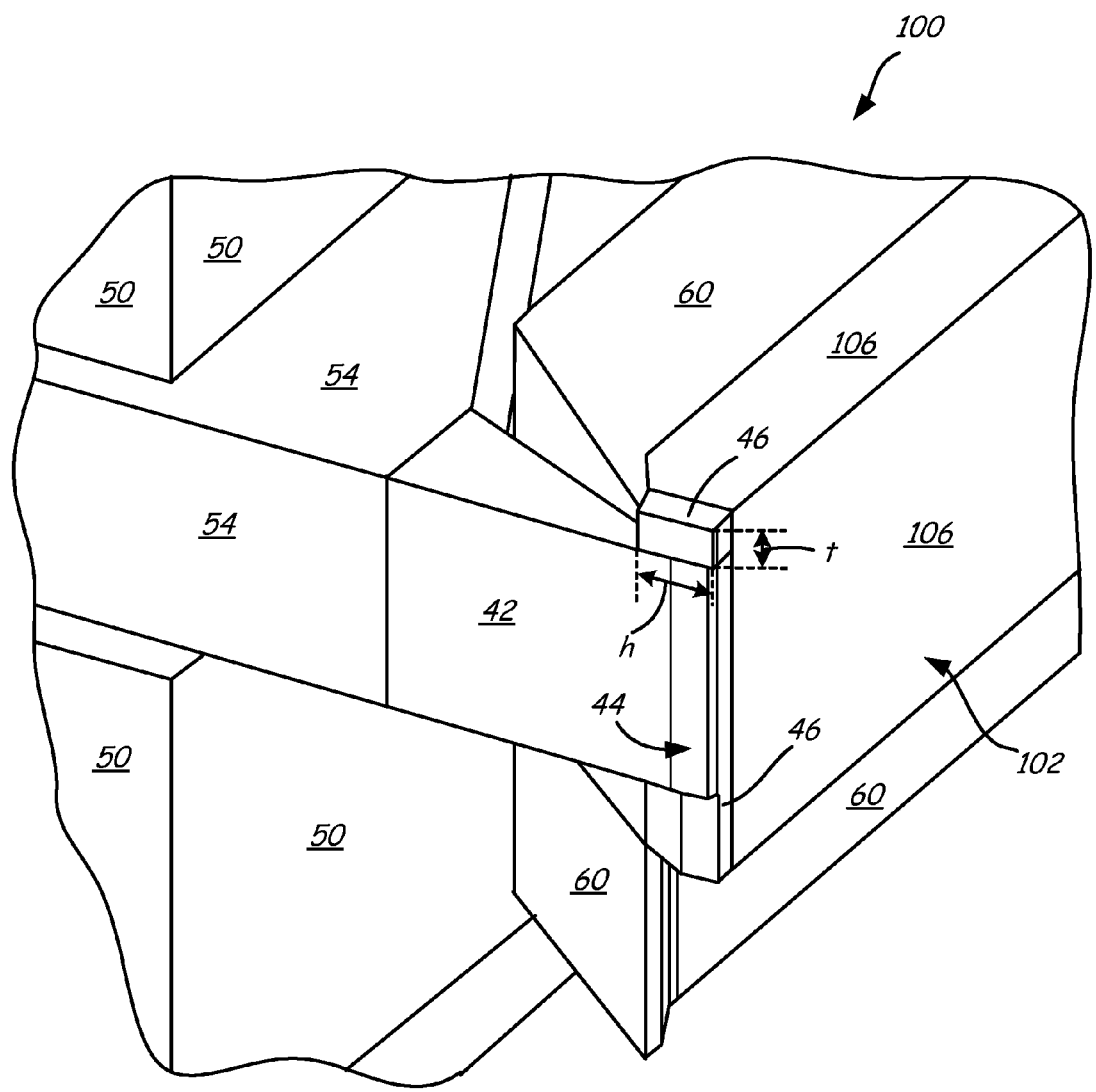
FIG. 3A is a perspective cross-sectional view of a magnetic writer including conductive leads/heat sinks that are partially exposed at the medium confronting surface.
Figure 3B:
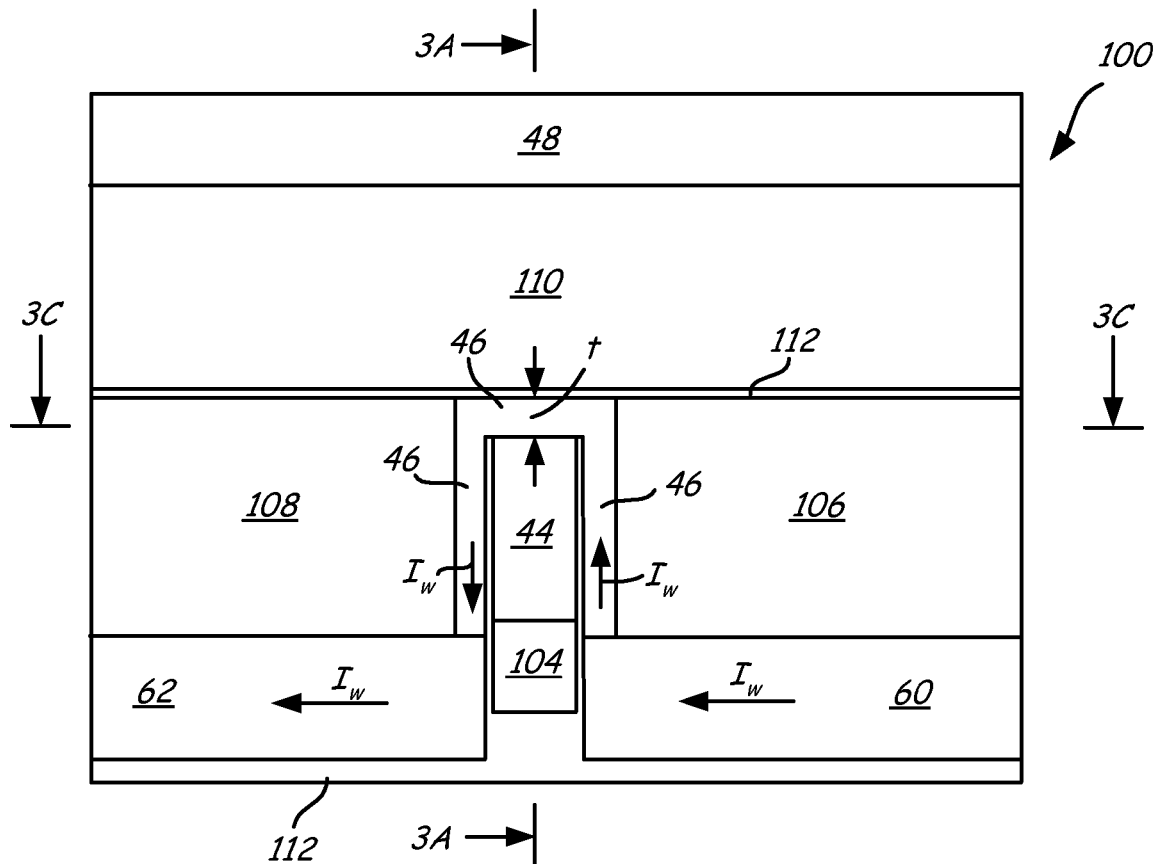
FIG. 3B is a medium confronting surface view of the magnetic writer of FIG. 3A.
Figure 3C:
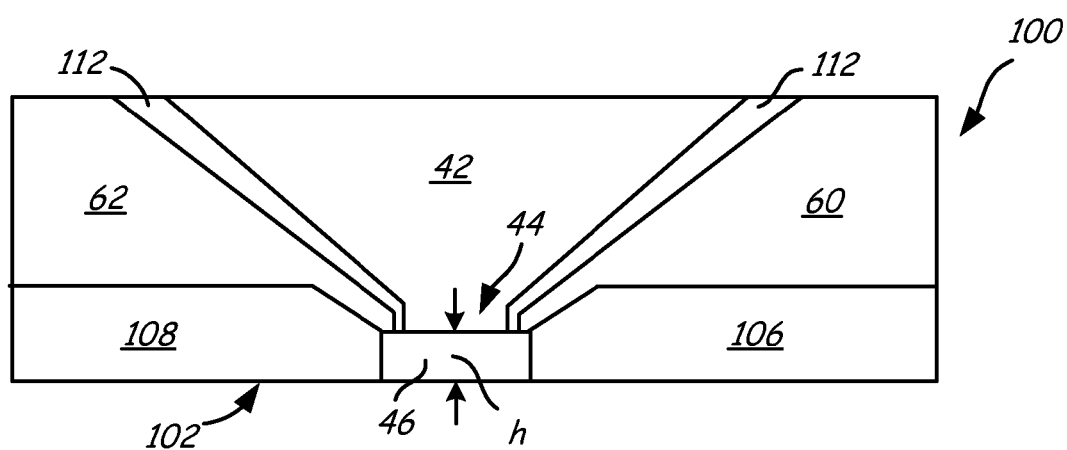
FIG. 3C is a cross-sectional view of the magnetic writer of FIGS. 3A and 3B taken along line 3C-3C.

FIG. 3A is a cross-sectional perspective view of magnetic writer 100 including lead/heat sink 60 partially exposed at medium confronting surface 102. Lead/heat sink 62 is not visible in the cross-sectional view of FIG. 3A. FIG. 3B is a medium confronting surface view of magnetic writer 100, and FIG. 3C is a cross-sectional view of magnetic writer 100 along line 3C-3C in FIG. 3B. The cross-section shown in FIG. 3A is along line 3A-3A in FIG. 3B. Magnetic writer 100 includes write element 42 with write element tip 44, return element 48, first lead/heat sink 60, second lead/heat sink 62, conductor 46, nonmagnetic base 104, first side shield 106, second side shield 108, trailing shield 110, and insulating material 112.

Write element tip 44 of write element 42 is at medium confronting surface 102 and is adjacent nonmagnetic base 104. Nonmagnetic base 104 is on a trailing side of write element tip 44. Conductor 46 is adjacent to write element tip 44 and extends along three surfaces of write element tip 44 at medium confronting surface 102. Insulating material 112 is between conductor 46 and write element tip 44 at medium confronting surface 102 and along the sides of write element 42 extending from medium confronting surface 102. Trailing shield 110 is between conductor 46 and return element 48 and is separated from conductor 46 and side shields 106 and 108 by insulating material 112. Leads/heat sinks 60 and 62 have a cross-sectional area that is large compared to the cross-sectional area of conductor 46.

First side shield 106 and second side shield 108 are disposed on opposite sides of write element 42 in a cross-track direction. In some embodiments, side shields 106 and 108 are insulated from the adjacent conductor 46 and leads/heat sinks 60 and 62. In other embodiments, leads/heat sinks 60 and 62 are in electrical contact with side shields 106 and 108, respectively. In the latter case, because leads/heat sinks 60 and 62 are typically comprised of a material having a much lower resistance than the material of side shields 106 and 108, most of the current $I_w$ is carried by leads/heat sinks 60 and 62. In addition, insulating material 112 isolates leads/heat sinks 60 and 62 from each other, which forces current $I_w$ to pass through conductor 46.

Side shields 106 and 108 and trailing shield 110 may be made of a soft magnetic material, such as NiFe, CoFe, or a Cu/CoFe multilayer structure. Because side shields 106 and 108 and trailing shield 110 also act as heat sinks for conductor 46, side shields 106 and 108 and trailing shield 110 are made of a material having good thermal properties. Side shields 106 and 108 and trailing shield 110 confine the magnetic field profile of magnetic writer 100, since the soft magnetic material acts both as a return path for flux emanating from magnetic writer 100 and as a magnetic shield (shielding write pole tip 44 from fields emanating from adjacent tracks on magnetic medium 16). In an alternative embodiment, side shields 106 and 108 are replaced by non-magnetic blocks of material having good thermal properties and high corrosion resistance.

The majority of material of leads/heat sinks 60 and 62 is recessed from medium confronting surface 102 to reduce the exposure of leads/heat sinks 60 and 62 to corrosion inducing agents at medium confronting surface 102. As shown in FIG. 3B, first lead/heat sink 60 is adjacent to first side shield 106 on a side opposite medium confronting surface 102, and second lead/heat sink 62 is adjacent to second side shield 108 on a side opposite medium confronting surface 102. The recessed portion of first lead/heat sink 60 extends between write element 42 and first shield 106 to connect to conductor 46 on one side, and the recessed portion of second lead/heat sink 62 extends between write element 42 and second shield 108 to connect to conductor 46 on the opposite side.

The recessed portions of leads/heat sinks 60 and 62 are as close to medium confronting surface 102 as permitted by processing limitations and shield thickness requirements. In some embodiments, leads/heat sinks 60 and 62 are recessed from medium confronting surface 102 by a distance greater than or about equal to stripe height h of conductor 46. When leads/heat sinks 60 and 62 are recessed from medium confronting surface 102 by a distance about equal to stripe height h, the loss of magnetic, electrical, and thermal performance of conductor 46 is minimal (<10%) compared to when leads/heat sinks 60 and 62 are not recessed from medium confronting surface 102.

Leads/heat sinks 60 and 62 may be comprised of the same material as conductor 46. This prevents electromigration at the boundaries between leads/heat sinks 60 and 62 and conductor 46. In some embodiments, leads/heat sinks 60 and 62 and conductor 46 are comprised of Cu. The portion of leads/heat sinks 60 and 62 that extends to medium confronting surface 102 may alternatively be comprised of a different material than conductor 46 and the portion of leads/heat sinks 60 and 62 that is recessed from medium confronting surface 102 by side shields 106 and 108. In embodiments that the portion lead/heat sink 60 at medium confronting surface 102 is comprised of a different material than the recessed portion of lead/heat sink 60, the recessed portion of leads/heat sinks 60 and 62 and conductor 46 may be made of Cu and the portion of lead/heat sink 60 at medium confronting surface 102 may be made of Au, Al, or other materials suitable for use at medium confronting surface 102 that are resistant to corrosion.

Figure 4:
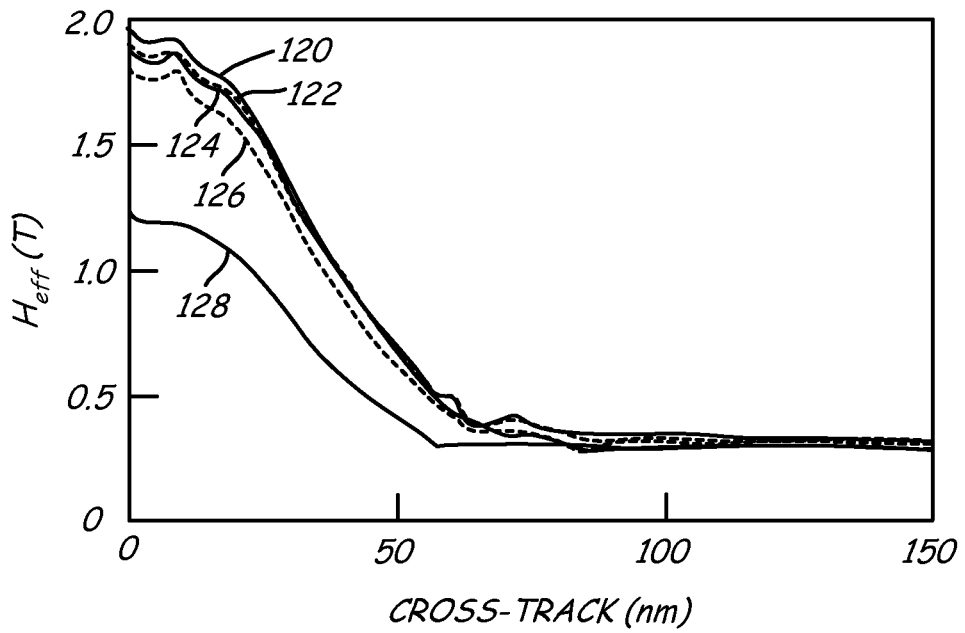
FIG. 4 is a graph of the effective field proximate the medium confronting surface for the magnetic writer of FIGS. 3A-3C as a function of cross-track position for conductors having various dimensions.

The dimensions of conductor 46 at the trailing edge of write element tip 44 can be set to maximize the effective field and improve the field gradient at medium confronting surface 102. Conductor 46 has a thickness t at a trailing edge of write element tip 44 and a stripe height h extending from medium confronting surface 102 to an edge of conductor 46 distal from medium confronting surface 102. To illustrate the effect of varying the dimensions of conductor 46, FIG. 4 is a graph showing the simulated effective field $H_{eff}$ (i.e., the combined write and assist field) at 10 nm from medium confronting surface 102 as a function of cross-track position for magnetic writer 100 based on magnetostatic finite element simulations. The dimensions of the trailing side of conductor 46 were varied, with the effective field $H_{eff}$ being measured from the symmetry plane of write element 42 (cross-track position 0 nm) moving in the cross-track direction from the symmetry plane.

Line 120 plots the effective field $H_{eff}$ for conductor 46 having a thickness t of 50 nm and a stripe height h of 50 nm (i.e., a 2,500 nm$^2$ cross-section). Line 122 plots the effective field $H_{eff}$ for conductor 46 having a thickness t of 100 nm and a stripe height h of 50 nm (i.e., a 5,000 nm$^2$ cross-section). Line 124 plots the effective field $H_{eff}$ for conductor 46 having a thickness t of 70.71 nm and a stripe height h of 70.71 nm (i.e., a 5,000 nm$^2$ cross-section). Line 126 plots the effective field $H_{eff}$ for conductor 46 having a thickness t of 50 nm and a stripe height h of 100 nm (i.e., a 5,000 nm$^2$ cross-section). The current density j for each simulated conductor 46 was $1.5 \times 10^9$ A/cm$^2$, with the exception of conductor 46 having a cross-section of 2,500 nm$^2$ (line 120), which had a current density j of $3.0 \times 10^9$ A/cm$^2$. For comparison, line 128 plots the write field generated by a substantially identical device without conductor 46. As is shown, the maximum field in the center of write element 44 (cross-track position 0) at the trailing edge ranged from about 1.95 T for conductor 46 having the smallest cross section (line 120) to about 1.8 T for conductor 46 having the largest stripe height h (line 126).

Figure 5:
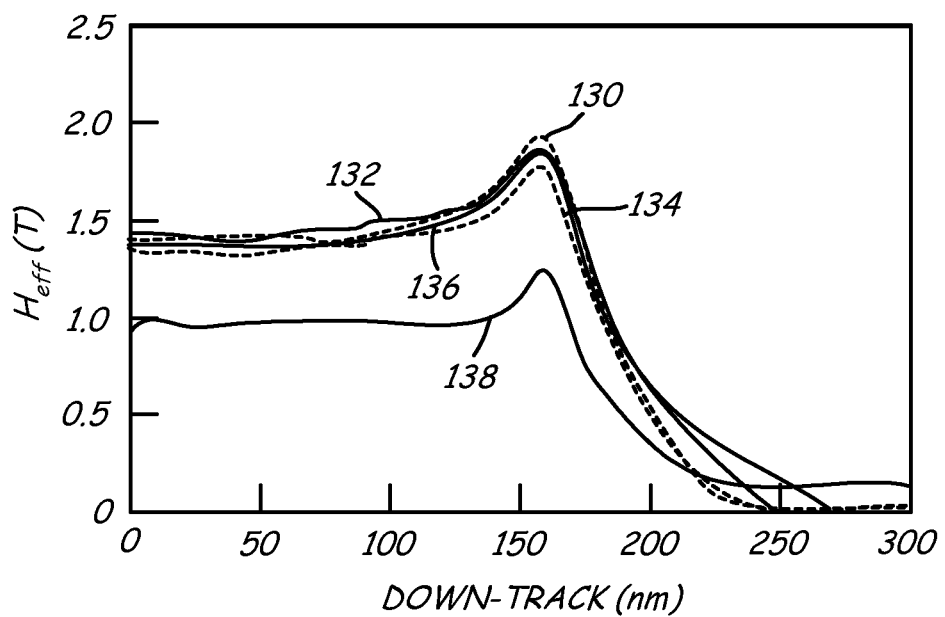
FIG. 5 is a graph of the effective field proximate the medium confronting surface for the magnetic writer of FIGS. 3A-3C as a function of down-track position for conductors having various dimensions.

The field gradient, which is also affected by the dimensions of conductor 46, is important to the sharpness of the transitions written by magnetic writer 100. FIG. 5 is a graph showing the down-track profile of effective field $H_{eff}$ generated by magnetic writer 100 based on magnetostatic finite element simulations. $H_{eff}$ was measured along the center symmetry plane of write element tip 44 at 10 nm from medium confronting surface 102. The leading edge of write element tip 44 is located at down-track position 0 nm, and the trailing edge of write element tip 44 is located at a down-track position of about 160 nm. Line 130 is the down-track field profile corollary to line 120, line 132 is the down-track field profile corollary to line 122, line 134 is the down-track field profile corollary to line 124, and line 136 is the down-track field profile corollary to line 126. For comparison, line 138 plots the down-track field profile generated by a substantially identical device without conductor 46. The field profile behind the trailing edge of write pole tip 44 (i.e., at down-track positions greater than 160 nm) is the area of interest for the field gradient. The sharper the transition of effective field $H_{eff}$ toward zero in this area, the larger the field gradient, and the better the transition that is written to magnetic medium 16. As is shown, magnetic writers 100 including conductors 80 having thickness t of 50 nm generated the largest field gradient. However, Ohmic losses, which lead to heating of conductor 46 and its surroundings and affect the reliability of magnetic writer 100, can be reduced by employing conductor 46 having a larger cross-section. Consequently, the device that performed most favorably among those simulated was the device with conductor 46 having thickness t of 50 nm and stripe height h of 100 nm (line 126 in FIG. 4 and line 136 in FIG. 5). If the choice of media properties allows for less stringent requirements on the field gradient, conductor 46 having thickness t of 70.71 nm and stripe height h of 70.71 nm (line 124 in FIG. 4 and line 134 in FIG. 5) would be preferred because it provides a larger effective field $H_{eff}$.

In order to assure conductor 46 delivers a maximum assist field while device specifications for total power consumption and field gradient are met and the reliability of conductor 46 is ensured, an optimization method for determining thickness t and stripe height h may be applied. The maximum current $I_{max}$ allowable by current source 64 (FIG. 2) drives conductor 46. Maximum current $I_{max}$ is limited by the pre-amplifier of current source 64, power consumption specifications of the recording system, and other recording system performance parameters such as flux leakage and side track erasure. The thickness t is then adjusted to obtain a suitable field gradient while keeping the thickness t as large as possible. The optimal value for the field gradient also depends on recording system parameters such as the type of magnetic medium 16 used. The maximum current density j that conductor 46 can sustain reliably is then determined, which is based on the material and resistance of conductor 46. The optimum stripe height h is then determined from the following equation:

$$h = \frac{I_{max}}{j_{max} \times t}. \quad \text{(Equation 1)}$$

Figure 6A:
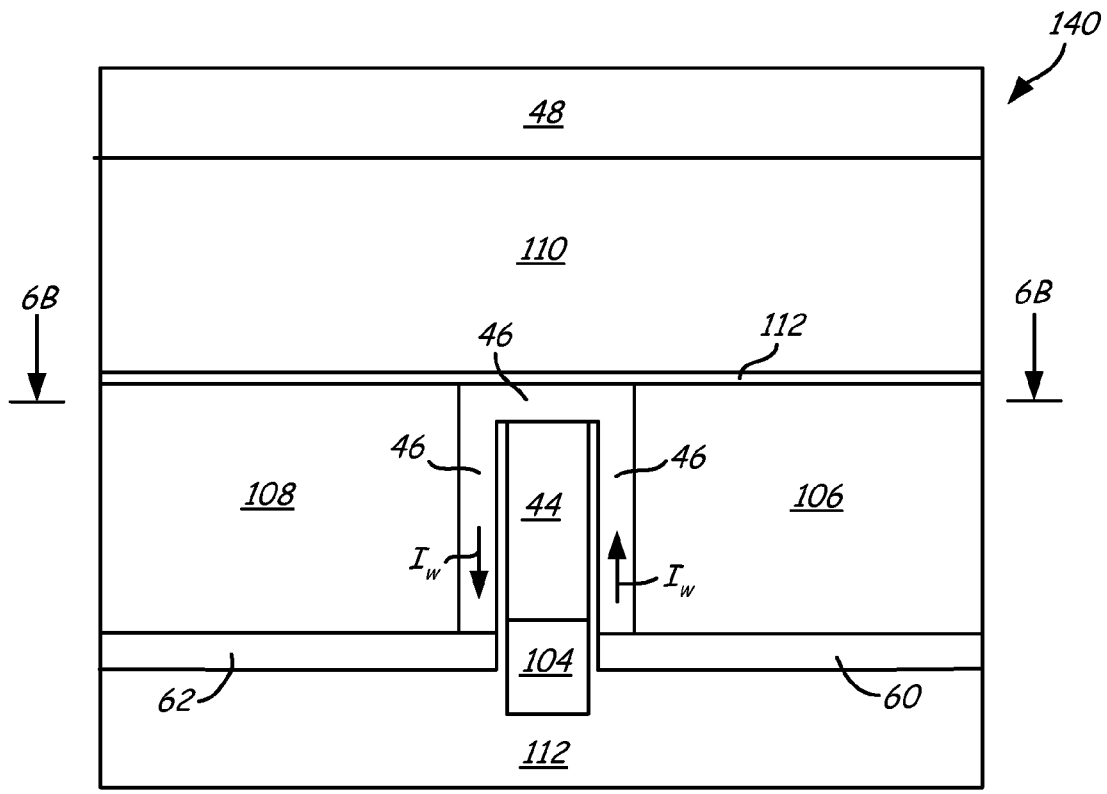
FIG. 6A is a medium confronting surface view of a magnetic writer including thin conductive leads/heat sinks exposed at the medium confronting surface.
Figure 6B:
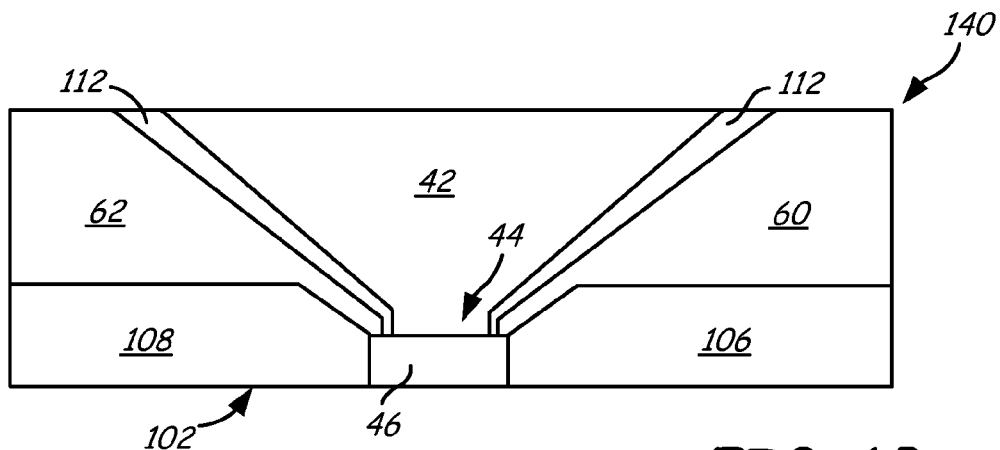
FIG. 6B is a cross-sectional view of the magnetic writer of FIG. 6A taken along line 6B-6B.

FIG. 6A is a medium confronting surface view of magnetic writer 140 including thin leads/heat sinks 60 and 62 exposed at medium confronting surface 102. FIG. 6B is a cross-sectional view of magnetic writer 140 taken along line 6B-6B in FIG. 6A. Magnetic writer 140 includes write element 42 with write element tip 44, return element 48, first lead/heat sink 60, second lead/heat sink 62, conductor 46, nonmagnetic base 104, first side shield 106, second side shield 108, trailing shield 110, and insulating material 112.

The components and arrangement of magnetic writer 140 are similar to that of magnetic writer 100 described above. In this embodiment, less material of leads/heat sinks 60 and 62 is exposed at medium confronting surface 102 to reduce further reduce the effects of corrosion inducing agents on the conductive materials of leads/heat sinks 60 and 62 and conductor 46 at medium confronting surface 102. As shown in FIG. 6B, first lead/heat sink 60 is adjacent to first side shield 106 on a side opposite medium confronting surface 102, and second lead/heat sink 62 is adjacent to second side shield 108 on a side opposite medium confronting surface 102. The recessed portion of first lead/heat sink 60 extends between write element 42 and first shield 106 to connect to conductor 46 on one side, and the recessed portion of second lead/heat sink 62 extends between write element 42 and second shield 108 to connect to conductor 46 on the opposite side.

The recessed portions of leads/heat sinks 60 and 62 are as close to medium confronting surface 102 as permitted by processing limitations and shield thickness requirements. In some embodiments, leads/heat sinks 60 and 62 are recessed from medium confronting surface 102 by a distance greater than or about equal to stripe height h of conductor 46. When leads/heat sinks 60 and 62 are recessed from medium confronting surface 102 by a distance about equal to stripe height h, the loss of magnetic, electrical, and thermal performance of conductor 46 is minimal compared to when leads/heat sinks 60 and 62 are not recessed from medium confronting surface 102.

Figure 7A:
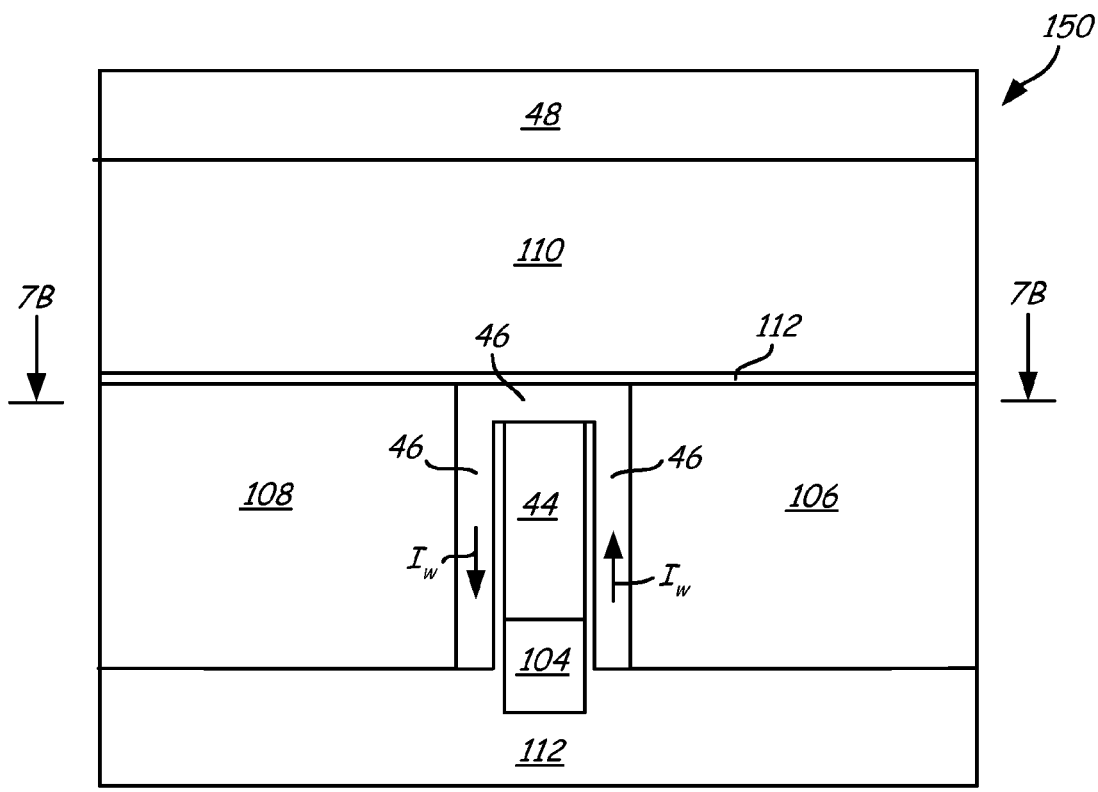
FIG. 7A is a medium confronting surface view of a magnetic writer with conductive leads/heat sinks completely recessed from the medium confronting surface.
Figure 7B:
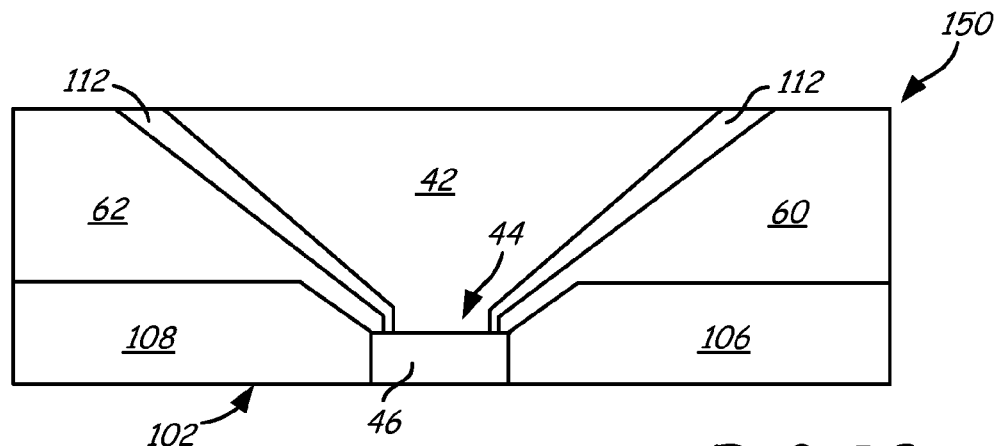
FIG. 7B is a cross-sectional view of the magnetic writer of FIG. 7A taken along line 7B-7B.

FIG. 7A is a medium confronting surface view of magnetic writer 150 including thin leads/heat sinks 60 and 62 exposed at medium confronting surface 102. FIG. 7B is a cross-sectional view of magnetic writer 140 taken along line 7B-7B in FIG. 7A. Magnetic writer 140 includes write element 42 with write element tip 44, return element 48, first lead/heat sink 60, second lead/heat sink 62, conductor 46, nonmagnetic base 104, first side shield 106, second side shield 108, trailing shield 110, and insulating material 112.

The components and arrangement of magnetic writer 150 are similar to that of magnetic writer 100 described above. In this embodiment, leads/heat sinks 60 and 62 are completely recessed from medium confronting surface 102 to prevent corrosion of leads/heat sinks 60 and 62. As shown in FIG. 7B, first lead/heat sink 60 is adjacent to first side shield 106 on a side opposite medium confronting surface 102, and second lead/heat sink 62 is adjacent to second side shield 108 on a side opposite medium confronting surface 102. First lead/heat sink 60 extends between write element 42 and first shield 106 to connect to conductor 46 on one side, and second lead/heat sink 62 extends between write element 42 and second shield 108 to connect to conductor 46 on the opposite side.

Leads/heat sinks 60 and 62 are as close to medium confronting surface 102 as permitted by processing limitations and shield thickness requirements. In some embodiments, leads/heat sinks 60 and 62 are recessed from medium confronting surface 102 by a distance greater than or about equal to stripe height h of conductor 46. When leads/heat sinks 60 and 62 are recessed from medium confronting surface 102 by a distance about equal to stripe height h, the loss of magnetic, electrical, and thermal performance of conductor 46 is minimal compared to when leads/heat sinks 60 and 62 are not recessed from medium confronting surface 102.

Figure 8:
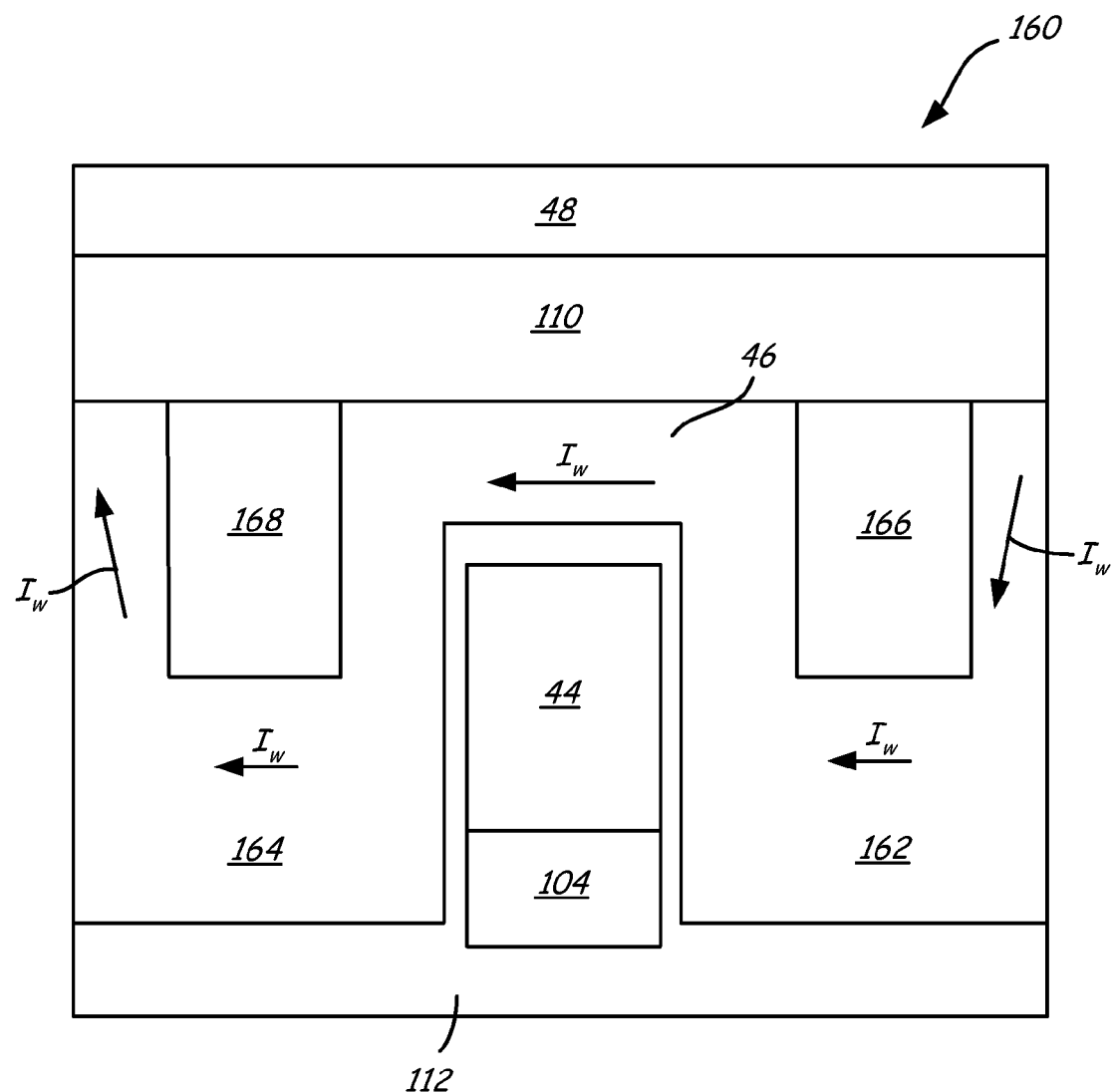
FIG. 8 is a medium confronting surface view of a magnetic writer including low conductivity trenches in the conductive leads/heat sinks.

FIG. 8 is a medium confronting surface view of magnetic writer 160 including thick leads/heat sinks 162 and 164 formed at the medium confronting surface. Magnetic writer 160 includes write element 42 with write element tip 44, return element 48, first lead/heat sink 162, second lead/heat sink 164, conductor 46, nonmagnetic base 104, trailing shield 110, and insulating material 112.

It is desirable to confine current $I_w$ in a thin conductive path close to write element tip 44 at or near the medium confronting surface to provide a stronger, more focused field with a high gradient proximate the trailing edge of write element tip 44. In order to provide these thin conductive paths, trenches 166 and 168 are formed in leads/heat sinks 162 and 164, respectively, and filled with an insulating material or other material that exhibits low electrical conductivity. The material in trenches 166 and 168 also provides sufficient thermal conductivity to efficiently transport heat away from conductor 46. When trenches 166 and 168 are filled with a material having these properties, current $I_w$ flows around these regions and flows around write element tip 44, thus improving the field strength of conductor 46 at write element tip 44. At the same time, heat sinking is supported by the thermal conductivity of the material, which improves the reliability of magnetic writer 160.

Trenches 166 and 168 may be filled with various materials that provide varying levels of thermal conductivity. For example, trenches 166 and 168 may be filled with a good insulator with low thermal conductivity, such as $Al_2O_3$, which forces current $I_w$ to flow around trenches 166 and 168 and provides strong field amplification, but poor heat sinking. Trenches 166 and 168 may alternatively be filled with a thin insulating layer followed by a back-fill of heat sink material (i.e., high thermal conductivity), such as Au or Cr. This also forces all current $I_w$ to flow around trenches 166 and 168, and provides strong field amplification and improved heat sinking. As another example, trenches 166 and 168 may be filled with thin diamond-like carbon (DLC) films, which have very high thermal conductivity but are still insulating. This forces all current $I_w$ to flow around trenches 166 and 168, and provides strong field amplification and excellent heat sinking. Trenches 166 and 168 may also be back-filled with a poorly conducting material, such as Rh (which has a resistivity of five times the resistivity of Cu) with no insulating layer. In this simple fabrication process, most of the current still flows around trenches 166 and 168 while good heat sinking is ensured. In another example, the trenches could be filled with insulating or low conductivity magnetic material, which forces current $I_w$ to flow around the trenches, but at the same time the magnetic material in the trenches can act as magnetic side shields. It should be noted that trenches 166 and 168 may also be incorporated into the recessed lead magnetic writer designs described above by recessing the leads with the trenches from the medium confronting surface.

In summary, the present invention relates to a magnetic device including a write element having a write element tip that defines a medium confronting surface. The write element is operable to generate a first field at the medium confronting surface. A conductor is proximate the write element tip and first and second conductive leads are connected to the conductor and configured to deliver a current to the conductor to generate a second field that augments the first field. First and second side elements are disposed on opposite sides of the write element tip in a cross-track direction at the medium confronting surface. At least a portion of the first conductive lead is disposed adjacent the first side element on a side opposite the medium confronting surface, and at least a portion of the second conductive lead is disposed adjacent the second side element on a side opposite the medium confronting surface. By recessing at least a portion of the conductive leads from the medium confronting surface, corrosion of the leads at the medium confronting surface is prevented. In addition, by forming the conductive leads as close to the medium confronting surface as possible, the effect on device performance is minimized. Furthermore, the dimensions of the conductor may be adjusted to maximize the assist field while optimizing the field gradient of the magnetic device.

Although the present invention has been described with reference to preferred embodiments, workers skilled in the art will recognize that changes may be made in form and detail without departing from the spirit and scope of the invention.

The invention claimed is:

1. An apparatus comprising:
   a write element including a write element tip that defines a medium confronting surface, wherein the write element is operable to generate a first field at the medium confronting surface;
   an assist device proximate the write element tip, the assist device has a stripe height extending from the medium confronting surface to a side of the assist device distal from the medium confronting surface;
   first and second conductive leads connected to the assist device and configured to enable the assist device to generate a second field that augments the first field, at least a portion of the first conductive lead and the second conductive lead are each recessed from the medium confronting surface a distance that is about equal to the stripe height; and
   first and second side elements disposed on opposite sides of the write element tip in a cross-track direction at the medium confronting surface, wherein at least a portion of the first conductive lead is disposed adjacent the first side element on a side opposite the medium confronting surface of the first side element, and wherein at least a portion of the second conductive lead is disposed adjacent the second side element on a side opposite the medium confronting surface of the second side element.

2. The apparatus of claim 1, wherein the first and second conductive leads and the assist device are comprised of the same material.

3. The apparatus of claim 1, wherein the first and second conductive leads are comprised of a different material than the assist device.

4. The apparatus of claim 1, wherein the assist device extends between the write element tip and the first and second side elements at the medium confronting surface.

5. The apparatus of claim 1, wherein the assist device is a conductor and the first and second conductive leads deliver current to the conductor to generate the second field.

6. The apparatus of claim 1, wherein the first and second side elements are comprised of a magnetic material.

7. The apparatus of claim 1, wherein the first and second side elements are comprised of a nonmagnetic material.

8. A magnetic device comprising:
   a write element including a write element tip, wherein the write element is operable to generate a first field at the write element tip;
   a conductor proximate the write element tip at a medium confronting surface, wherein the conductor has a maximum sustainable current density $j_{max}$, a stripe height h extending from the medium confronting surface to a side of the conductor distal from the medium confronting surface, and a thickness t extending in a down-track direction;
   first and second conductive leads connected to the conductor, at least a portion of the first conductive lead and the second conductive lead are each recessed from the medium confronting surface a distance that is about equal to the stripe height; and
   a current source that provides a current to the conductor through the first and second conductive leads to generate a second field that augments the first field, wherein the current source provides a maximum current $I_{max}$, and wherein the stripe height h is about equal to $$\frac{I_{max}}{j_{max} \times t}.$$

9. The magnetic device of claim 8, wherein the first and second conductive leads and the conductor are comprised of the same material.

10. The magnetic device of claim 8, wherein the first and second conductive leads are comprised of a different material than the conductor.

11. The magnetic device of claim 8, and further comprising:
    first and second side elements disposed on opposite sides of the write element tip in a cross-track direction at the medium confronting surface, wherein at least a portion of the first conductive lead is disposed adjacent the first side element on a side opposite the medium confronting surface, and wherein at least a portion of the second conductive lead is disposed adjacent the second side element on a side opposite the medium confronting surface.

12. The magnetic device of claim 11, wherein the conductor extends between the write element tip and the first and second side elements at the medium confronting surface.

13. The magnetic device of claim 11, wherein the first and second side elements are comprised of a magnetic material.

14. A magnetic writer comprising:
    a write element including a write element tip that defines a medium confronting surface, wherein the write element is operable to generate a first field at the medium confronting surface;
    a return element magnetically coupled to the write element distal from the medium confronting surface;
    a conductor proximate the write element tip at the medium confronting surface, the conductor a stripe height extending from the medium confronting surface to a side of the conductor distal from the medium confronting surface;
    first and second conductive heat sinks connected to the conductor and configured to deliver a current to the conductor to generate a second field that augments the first field, at least a portion of the first conductive heat sink and the second conductive heat sink are each recessed from the medium confronting surface a distance that is about equal to the stripe height; and
    first and second side shields disposed on opposite sides of the write element tip in a cross-track direction at the medium confronting surface, wherein at least a portion of the first side shield is disposed adjacent to the first conductive heat sink on a side of the first side shield opposite the medium confronting surface, and wherein at least a portion of the second side shield is disposed adjacent to the second conductive heat sink on a side of the second side shield opposite the medium confronting surface.

15. The magnetic writer of claim 14, and further comprising:
    a current source that provides a current to the conductor to generate a second field that augments the first field, wherein the current source provides a maximum current $I_{max}$, wherein the conductor has a maximum sustainable current density $j_{max}$, a stripe height h extending from the medium confronting surface to a side of the conductor distal from the medium confronting surface, and a thickness t extending in a down-track direction, and wherein the stripe height h is about equal to $$\frac{I_{max}}{j_{max} \times t}.$$

16. The magnetic writer of claim 14, wherein the first and second conductive heat sinks and the conductor are comprised of the same material.

17. The magnetic writer of claim 14, wherein the first and second conductive heat sinks are comprised of a different material than the conductor.

18. The magnetic writer of claim 14, wherein the conductor extends between the write element tip and the first and second side shields at the medium confronting surface.

\* \* \* \* \*